Figure 1:
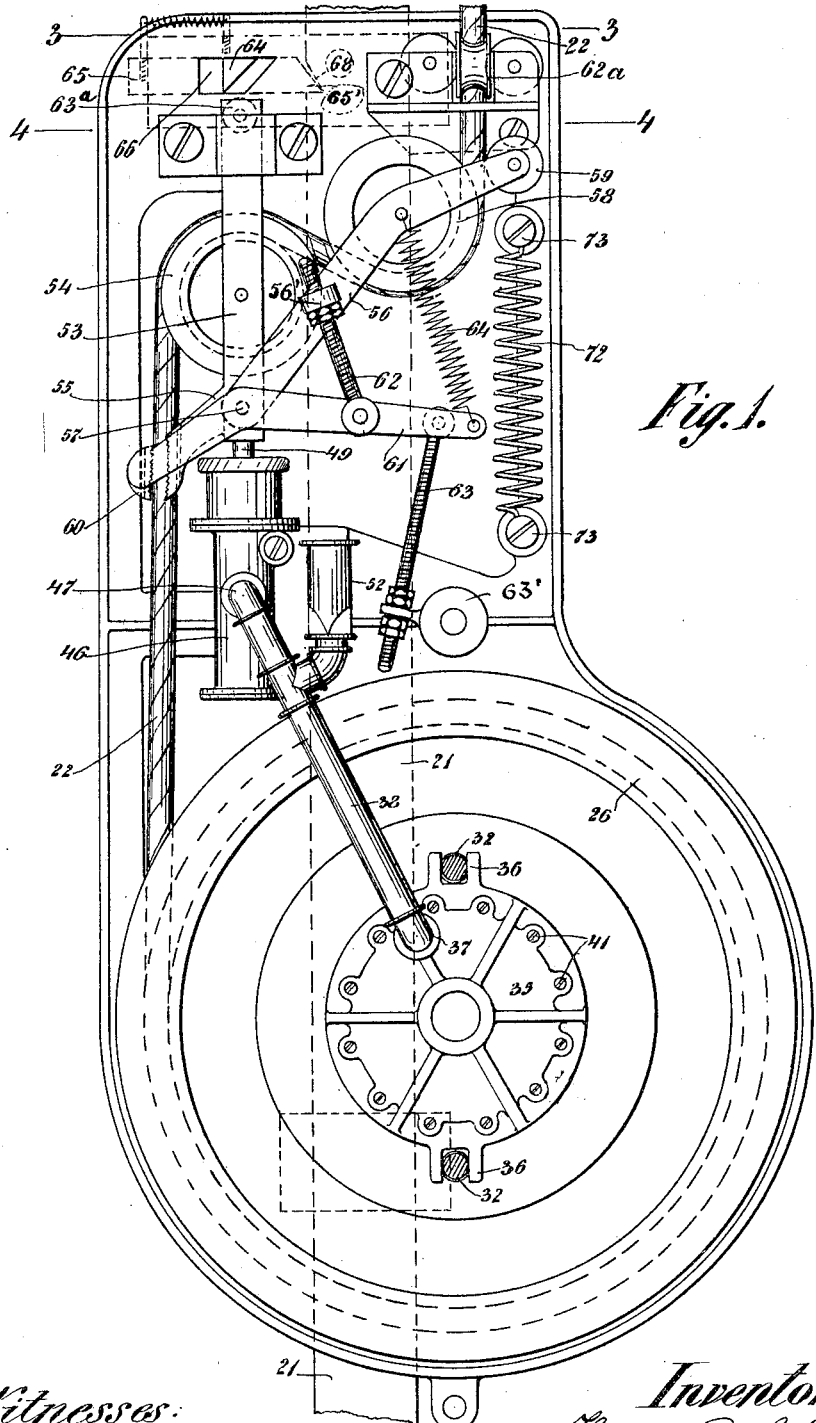

No. 803,210. PATENTED OCT. 31, 1905.
H. B. CLARKE.
TROLLEY RETRIEVING DEVICE.
APPLICATION FILED JAN. 16, 1905.

5 SHEETS—SHEET 1.

Witnesses
Geo. M. Mayer
Em. Nowak

Inventor
Henry B. Clarke
by Offield, Towle & Linthicum
Attorneys.

No. 803,210. PATENTED OCT. 31, 1905.
H. B. CLARKE.
TROLLEY RETRIEVING DEVICE.
APPLICATION FILED JAN. 16, 1905.

5 SHEETS—SHEET 3.

Witnesses:
Geo. M. Mayer
Em. Nowak

Inventor
Harry B. Clarke
by Offield Towle & Linthicum
Attorneys

No. 803,210. PATENTED OCT. 31, 1905.
H. B. CLARKE.
TROLLEY RETRIEVING DEVICE.
APPLICATION FILED JAN. 16, 1905.

5 SHEETS—SHEET 4.

Witnesses:
Geo. M. Mayer
Em. Nowak

Inventor
Henry B. Clarke
by Offield, Towle & Linthicum
Attorneys

No. 803,210. PATENTED OCT. 31, 1905.
H. B. CLARKE.
TROLLEY RETRIEVING DEVICE.
APPLICATION FILED JAN. 16, 1905.

5 SHEETS—SHEET 5.

Witnesses:
Geo. M. Mayer
Em. Nowak

Inventor
Henry B. Clarke
by Offield, Towle & Linthicum
Attorneys

UNITED STATES PATENT OFFICE.

HENRY B. CLARKE, OF CHICAGO, ILLINOIS.

TROLLEY-RETRIEVING DEVICE.

No. 803,210.　　　Specification of Letters Patent.　　　Patented Oct. 31, 1905.

Application filed January 16, 1905. Serial No. 241,310.

*To all whom it may concern:*

Be it known that I, HENRY B. CLARKE, a citizen of the United States, residing at Chicago, in the county of Cook and State of Illinois, have invented new and useful Improvements in Trolley-Retrieving Devices, of which the following is a specification.

This invention relates to trolley-retrieving devices of that general character adapted to be attached to the trolley-cord of a street-car or the like for the purpose of preventing the trolley from rising into contact with overhead wires when it becomes disengaged from the trolley-wire, said device being caused to operate by a sudden pull or jerk upon the trolley-cord—as, for instance, when the trolley-pole jumps off the trolley-wire and is thrown upwardly under the tension of its spring—and operating automatically to draw said trolley-pole to a position below all overhead wires.

Among the salient objects of the invention are to provide a device which while keeping the trolley-cord taut at the same time permits the usual and necessary movements of the trolley-pole during the travel of the car and which operates when the trolley becomes disengaged from the trolley-wire to draw said trolley to a position below the trolley-wire, cross-wires, and overhead supports, and thereby prevent its damaging contact therewith; to provide a device of the character referred to in which an auxiliary source of power, such as the air for the brakes, is thrown into action by the disengagement of the trolley-pole from the trolley-wire and utilized to lock the take-up mechanism of the device and prevent the trolley-cord from being paid out thereby; to provide a device capable of bodily movement to lower the trolley-pole when the latter has become disengaged from the trolley-wire, said bodily movement being controlled by a trip mechanism actuated by the abnormal movement of the trolley-pole, and, in general, to provide a device of the character referred to which is efficient, practicable, and durable.

The invention will be readily understood from the following description and accompanying drawings, in which—

Figure 2:
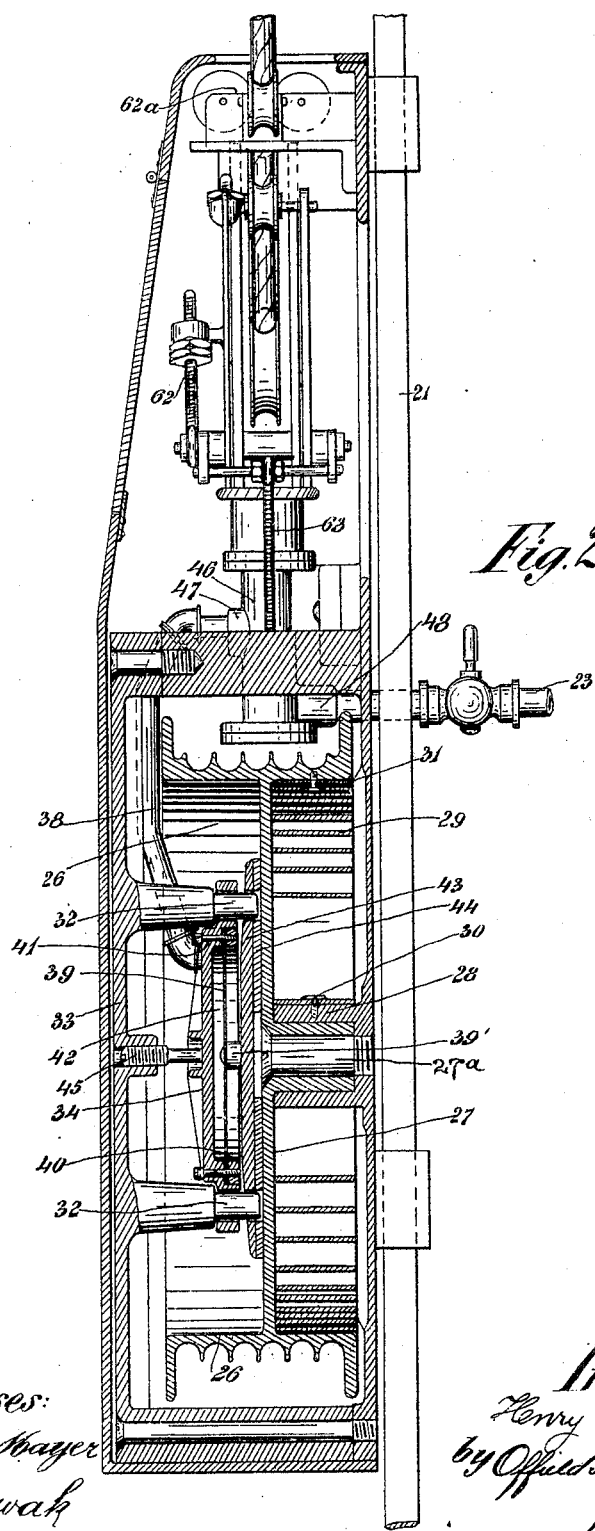
Figure 3:
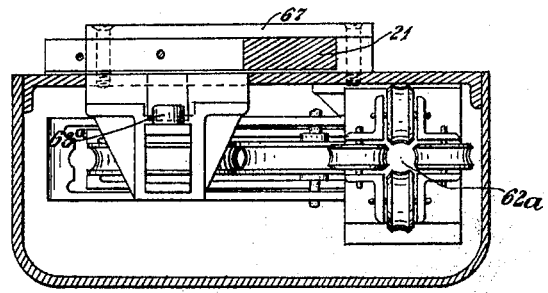
Figure 4:
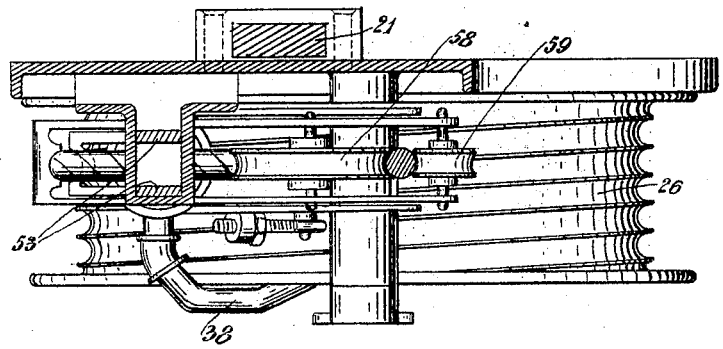
Figure 5:
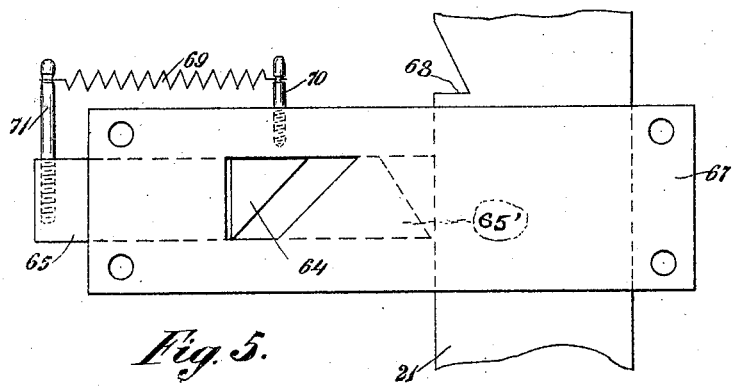
Figure 6:
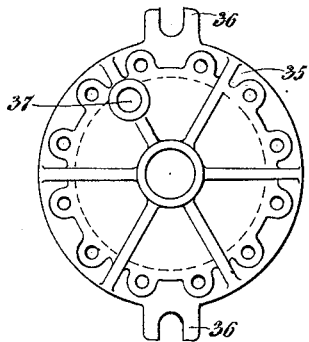
Figure 7:
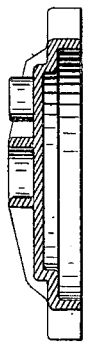
Figure 8:
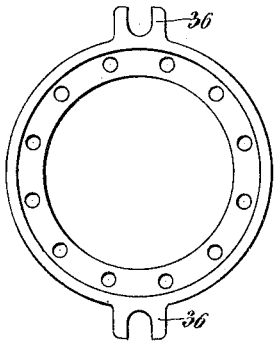
Figure 9:
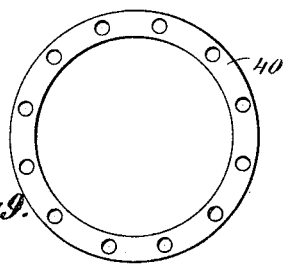
Figure 10:
Figure 11:
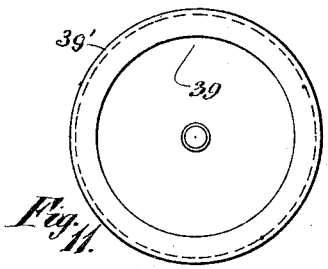
Figure 12:
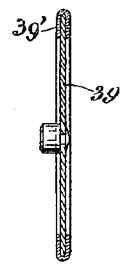
Figure 13:
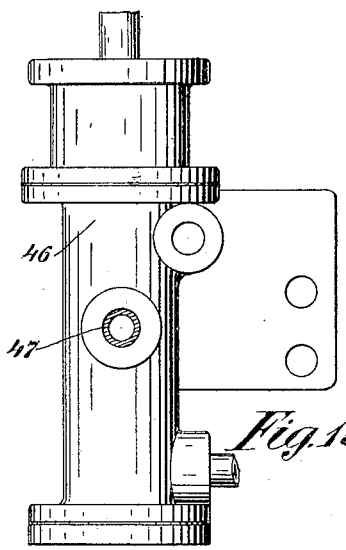
Figure 14:
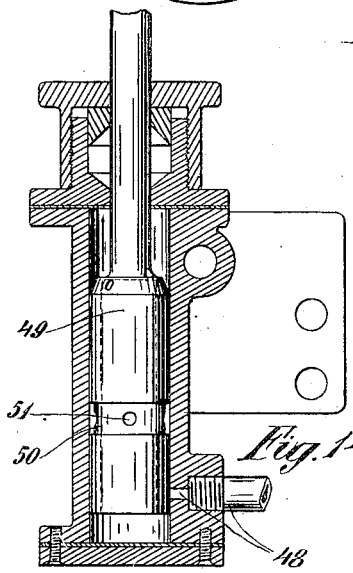
Figure 15:
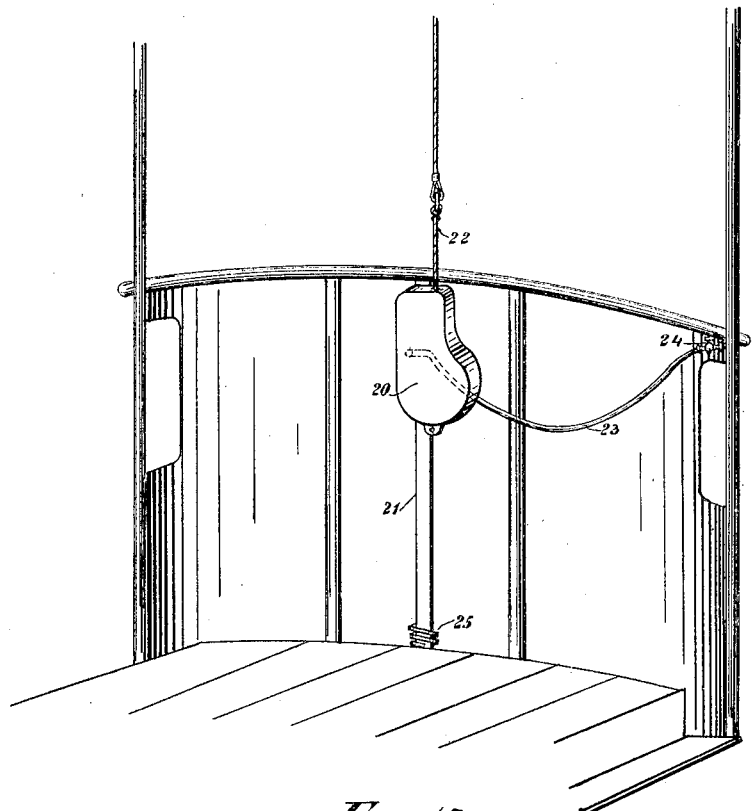
Figure 16:
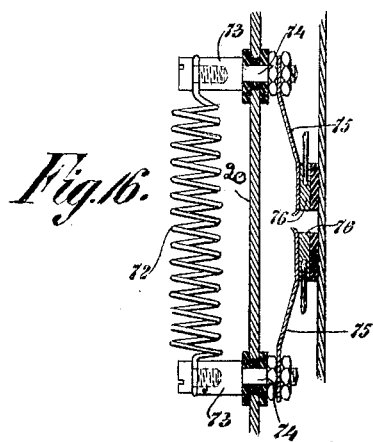

Figure 1 is a front or side view of the device with the wall of the casing removed. Fig. 2 is an edge view of the device with parts shown in section. Fig. 3 is a cross-sectional view taken on line 3 3 of Fig. 1. Fig. 4 is a cross-sectional view taken on line 4 4 of Fig. 1. Fig. 5 is a detail view of a tripping mechanism which holds the device in normal position. Figs. 6, 7, and 8 are front, sectional, and rear views, respectively, of a diaphragm-casing constituting a part of a locking mechanism for locking the take-up mechanism of the device. Figs. 9 and 10 are side and edge views, respectively, of a clamping-ring for securing the diaphragm in place. Figs. 11 and 12 are side and edge views, respectively, of the diaphragm with a packing band or washer over the edge thereof. Figs. 13 and 14 are side elevation and sectional views, respectively, of a piston-valve mechanism for controlling the inflow of the auxiliary motive fluid. Fig. 15 is a view showing the dashboard of a car with the invention in place, and Fig. 16 is a detail view showing an electric heater for the inside of the casing of the device.

The device, as shown in the drawings for the purpose of illustration and description, comprises a somewhat irregular shaped casing 20, mounted upon the dashboard of a street-car or the like, (see Fig. 15,) and is adapted to move upon a vertical supporting-bar 21, said device being normally held in place at the upper end of said bar by a trip mechanism. (Shown in Fig. 5 and hereinafter more particularly referred to.) The casing 20 contains a take-up mechanism to which the trolley-cord 22 is attached, said take-up mechanism being constructed to take up and pay out the trolley-cord as required by the various movements of the trolley-pole as the car travels over the road. The take-up mechanism of said device is controlled by a piston-valve mechanism within said casing and connected with the air-supply of the car by means of a flexible hose-pipe 23.

The supply of air may be regulated or cut off entirely by the conductor or other attendant by means of a stop-cock 24, said valve mechanism being also connected with the trolley-cord and operated by any sudden or quick pull upon the latter, as when the trolley jumps from the trolley-wire. The actuation of said valve mechanism operates to lock the take-up mechanism against paying out the trolley-cord and also to trip the trip mechanism and permit the device to move downwardly until it rests upon a bumper or stop-spring 25. This downward movement of the device draws the trolley-pole to a position below the overhead wires and supports.

Describing the device in detail, 26 designates a hollow drum provided with the usual peripheral grooves to receive the trolley-cord and provided on its interior with a partition member 27, by means of which it is revolubly mounted upon an axle 27ª, screwed into a supporting member 28 upon the back wall of the casing. Said drum is actuated by a coiled spring 29, mounted therein on one side of said partition member and attached at one end to the support 28, as at 30, and at its other end to the interior of the drum, as at 31. The action of said spring is to revolve said drum in a direction to wind up the trolley-cord upon the drum or to permit its back motion to pay out the trolley-cord as the trolley-pole moves into the various positions during the travel of the car.

Projecting into the other side of the hollow drum are a couple of arms or studs 32 32, mounted upon a frame member 33 and adapted to support a diaphragm mechanism, (designated as a whole 34,) which latter is adapted to frictionally lock the drum against rotation. Said diaphragm mechanism comprises a frame member 35, constructed, as shown in Figs. 6, 7, and 8, with the U-shaped ears or lugs 36 36 for holding it in position upon the studs 32 32 and also provided with a port-opening 37 to receive the end of a supply-pipe 38, connected with any suitable air-supply.

39 designates a diaphragm provided with a contact-block 39' and mounted in the frame 35 by means of a clamping-ring 40 and the bolts 41 and forming a chamber 42, said diaphragm being provided around its edge with a packing band or washer 39', as shown in Figs. 11 and 12.

43 designates a disk member movably mounted upon the ends of the studs 32 32 and carrying on its face adjacent the drum-partition 27 a friction member 44, which is preferably of rubber. Said disk 43 and friction member 44 are adapted to be moved into frictional locking engagement with the partition member 27 of the drum by the movement of the diaphragm 39, caused by the admission of air or other suitable fluid into the chamber 42, whereupon the contact-block 39' engages said disk 43 and moves it into holding engagement with the wall of the drum. The position of the diaphragm mechanism on the studs 32 32 may be regulated by means of a set-screw 45.

46 designates as a whole a piston-valve mounted within the casing, the chamber of which valve is connected at 47 with the supply-pipe 38 and at 48 with the flexible hose-pipe 23, which is in turn connected with the air-supply for the brake mechanism of the car. The piston 49 comprises a hollow member having a reduced portion 50 intermediate its ends, with outlet-ports 51 through the wall thereof. Said piston when in its lowermost or normal position closes the inlet-opening at 48; but when raised a short distance, in a manner hereinafter referred to, the supply of air enters below the piston and forces it to its uppermost position, in which position the reduced portion 50 registers with the outlet 47, whereupon the air escapes through the ports 51 to the supply-pipe 38 and into the diaphragm-chamber 42, with the result that the diaphragm is moved outwardly to cause a frictional locking engagement between the rubber member 44 and the drum, whereby the latter is held against rotation.

A whistle or other signal 52 may be mounted upon the supply-pipe 39, if desired, to signal the operation of the device.

53 designates a fork-like member mounted upon the upper end of the piston 49 and which carries between its arms a pulley 54, over which the trolley-cord passes in the manner shown. The lower end of said member 53 is provided with a toe-piece 55, which constitutes one member of a pair of clamping-jaws, hereinafter again referred to. 56 designates a lever pivotally connected at 57 with the member 53 and carrying between its arms a pulley 58, under which the trolley-cord passes from the pulley 54, as shown. Said lever 56 carries at its extreme upper end a smaller pulley 59, which rests against the trolley-cord 22 in the manner shown, and at its lower end said lever 56 projects beyond the trolley-cord and carries a second jaw member 60, which coöperates with the jaw member on the toe-piece 55 above referred to. When the parts are in their normal position, the trolley-cord passes freely around the pulleys 58 54 and through the clamping-jaws at 60.

61 designates an adjusting-lever pivotally connected at one end with the members 53 and 56, as at 57, and is provided with adjusting-screws 62 and 63. The screw 62, which works through an ear 56' upon the lever 56 and is provided at a point below said ear with lock-nuts, constitutes a stop adjustment to prevent the lever 56 from dropping downwardly too far, while permitting it to rise a limited amount, and the screw 63, attached to the ear 63', supports the adjusting-lever 61 in any desired position to regulate the tension of a spring 64, connected between the outer end of the lever 61 and the lever 56, as shown, and serves to hold the member 56 and the pulley 58 in yielding engagement with the trolley-cord 22.

A series of pulleys, designated as a whole 62ª, mounted in the upper portion of the casing, constitute a guide for the trolley-cord, as will be readily understood by reference to Figs. 1 and 3.

The upper end of one of the arms of the fork-like member 53 carries a cam or roller block 63ª, (see Figs. 1, 3, and 5,) adapted to engage a cam member 64, mounted upon a sliding member 65 and projecting into the casing through an opening 66 in the back wall thereof. Said sliding member 65 is carried in a frame 67, mounted upon the back of the casing 20, and through which the supporting-bar 21 passes, said supporting-bar 21 being provided near its upper end with a notch 68, into which the end of said sliding member fits to support the device at the upper end of said supporting-bar, as will be understood by reference to Figs. 1 and 15.

In order to automatically move and hold the sliding member 65 into said notch 68 when the device is raised to the upper end of the bar 21, a spring 69, connected at one end with a pin 70 upon the frame 67, carried by the casing 20, and at its other end with a pin 71 upon the sliding member 65 of said casing is provided, as clearly shown in Fig. 5. It will be seen, therefore, that when the lever mechanism is actuated and the piston raised the cam-block or roller $63^a$ on the upper end of the member 53 will engage the beveled surface of the cam member 64 projecting through the frame 67 and into the casing 20 and move the sliding member 65 out of the notch 68, which will allow the whole device to move downwardly to the lower end of the supporting-bar 21 until it strikes the stop-spring 25 at the bottom of the bar 21. This movement of the device operates to draw the trolley-pole downwardly the desired distance, it being understood that the diaphragm mechanism has operated to lock the drum against paying out the trolley-cord.

In order to prevent the lubricating fluid from becoming too thick and interfering with the perfect operation of the device, I provide an electric heater, as shown in Fig. 16. This heater comprises an electric coil 72, supported between two posts 73 73, passing through the back of the casing 20 and insulated therefrom, as at 74 74. A pair of contact-springs 75 75, connected with said post members, project in such positions as to engage two stationary contact members 76 76, mounted upon and insulated from the dashboard of the car in such a position as to make proper contactual engagement when the device is in its normal position at the upper end of the supporting-bar 21. The stationary contact members 76 76 are connected in circuit with the motor mechanism of the car upon which it is mounted.

The operation of the device will no doubt be understood from the above description, but may be briefly stated as follows: When the trolley jumps from the trolley-wire, it jerks upwardly on the trolley-cord. This sudden upward movement of the trolley-cord raises the pulley 58 and the lever 56, which clamps the trolley-cord between the clamping-jaws at 60. At the same time the piston is moved upwardly sufficiently to open the inlet-port 48, which permits the air to pass into the cylinder and raise the piston sufficiently to open a passage-way from the valve-chamber through the opening at 47 to the supply-pipe 38 and into the diaphragm-chamber 42, which operates to lock the drum against rotation. At the end of the movement of the piston and lever mechanism upwardly the cam-block 63 engages the cam member 64 on the sliding member 65 and moves it out of engagement with the supporting-bar 21 and allows the whole device to move downwardly, as above described, which movement draws the trolley-pole to the desired position below the overhead wires and supports.

While I have herein shown and described a preferred embodiment of the invention, it is obvious that alterations and modifications can be made in the details of construction and arrangement without departing from the spirit of the invention, and I do not, therefore, limit the invention to these details, except in so far as they are made the subject-matter of specific claims.

I claim—

1. A trolley-retrieving device comprising in combination with a suitable casing and support therefor, a take-up member movably mounted within said casing and connected with the trolley-cord, a locking mechanism for locking said take-up member against movement, a trip mechanism for holding said device in its normal position upon its support, said locking and trip mechanisms being operatively connected with the trolley-cord and adapted to be actuated by an increased tension upon said cord, whereby to lock said take-up member and trip said trip mechanism for the purpose described.

2. A trolley-retrieving device comprising in combination with a suitable casing and support therefor, a take-up member movably mounted within said casing and connected with the trolley-cord, a fluid-actuated locking mechanism for locking said take-up member against movement, a valve mechanism for controlling the admission of fluid to said locking mechanism, and a trip mechanism for holding said device in its normal position upon its support, said valve and trip mechanisms being operatively connected with the trolley-cord and adapted to be actuated by increased tension upon said cord, whereby to cause said locking mechanism to operate and to actuate said trip mechanism for the purpose described.

3. A trolley-retrieving device comprising in combination with a suitable casing and support therefor, a spring-actuated take-up drum for the trolley-cord, a brake mechanism for said drum, a trip mechanism for holding said device in its normal position upon said support, said brake and trip mechanisms being operatively connected with the trolley-cord and actuated by an increased tension upon said cord, whereby to set said brake mechanism and trip said trip mechanism to allow said device to move downwardly to pull down said trolley.

4. A trolley-retrieving device comprising a suitable casing, a take-up drum and means for actuating the same mounted therein, a diaphragm-brake mechanism adapted to engage the wall of said drum, a fluid-supply for actuating said diaphragm, a valve mechanism for controlling the admission of said fluid to said diaphragm mechanism, and operative connections between said valve mechanism and the trolley-cord, whereby increased tension upon said trolley-cord actuates said valve mechanism and sets said brake mechanism.

5. A trolley-retrieving device comprising a suitable casing, a take-up drum and means for actuating the same mounted in said casing, a diaphragm-brake mechanism arranged to act upon the wall of said drum, a fluid-supply for actuating said diaphragm, a valve mechanism controlling the flow of said fluid to said diaphragm mechanism, a trip mechanism normally supporting said device, said valve and trip mechanisms being operatively connected with the trolley-cord, whereby increased tension on said cord operates said valve mechanism and sets said brake and releases said trip mechanism to permit said device to move bodily downward to lower said trolley.

6. In a trolley-retrieving device, the combination of a spring-actuated take-up drum connected with the trolley-cord, a friction-brake mechanism operating upon said drum, a trip mechanism carried by the casing thereof holding said device in normal position, a supporting member upon which said device is movably mounted, and operative connections between said brake and trip mechanisms and the trolley-cord, whereby an increased tension on said cord actuates said trip and brake mechanism and allows said device to move bodily downward upon said supporting member, for the purpose described.

7. A trolley-retrieving device, comprising in combination with the casing and take-up mechanism thereof, a supporting member upon which said device is bodily movable, a trip member upon said casing and holding said device in normal position upon said support, means for locking said take-up mechanism against paying out said trolley-cord, and operative connections between said cord and said trip mechanism whereby increased tension on said cord positively moves said trip member out of engagement with said support to allow said device to move downwardly upon said supporting member for the purpose of drawing said trolley downwardly clear of the trolley-wire and cross-wires.

8. In a trolley-retrieving device, the combination with the casing and support therefor, of a spring-actuated take-up drum for the trolley-cord, a diaphragm-brake mechanism for locking said drum against rotation, a source of fluid-supply for actuating said diaphragm-brake mechanism, a piston-valve controlling the admission of said fluid to said brake mechanism, a series of levers and pulleys connected with said piston-valve and through which said trolley-cord passes, means normally holding said levers and pulleys free from binding engagement with said cord, said means adapted to be overcome by increased tension on said cord, whereby said piston and mechanism is raised sufficiently to cause said brake mechanism to operate, substantially as and for the purpose described.

9. In a trolley-retrieving device, the combination with the casing and support therefor, of a trip member normally holding said device in position on said support, a spring-actuated take-up drum for the trolley-cord, a fluid-actuated brake mechanism for locking said drum against rotation, a source of fluid-supply for said brake mechanism, a piston-valve controlling the admission of said fluid to said brake mechanism, a series of levers and pulleys connected with the piston of said valve and through which said trolley-cord passes freely under normal conditions, a cam member mounted upon said piston and adapted to actuate said trip member, and clamping-jaws upon said lever mechanism adapted to clamp said trolley-cord when the latter is subjected to an increased tension and to lift said piston-valve and lever mechanism for the purpose of actuating said brake and trip mechanisms, substantially as and for the purpose described.

10. In a trolley-retrieving device, the combination with a suitable casing therefor, of a take-up member and means for actuating same mounted within said casing, a fluid-actuated diaphragm-brake mechanism adapted to engage a part moving with said take-up member, and means for controlling the fluid-supply to said diaphragm controlled by said trolley.

11. A trolley-retrieving device comprising in combination with a suitable casing and support therefor, a take-up member movably mounted within said casing and connected with the trolley-cord, a locking mechanism for locking said take-up member against movement, a trip mechanism for holding said device in its normal position upon its support, said locking and trip mechanisms being operatively connected with the trolley-cord and adapted to be actuated by an increased tension upon said cord, whereby to lock said take-up member and trip said trip mechanism, an electric heater mounted within said casing for regulating the temperature therein, and contact members upon said casing and said support whereby to connect said heater in circuit with the car when said device is in its normal position, substantially as described.

HENRY B. CLARKE.

Witnesses:
P. P. MARTIN,
GEORGE ALLAN.